US006748544B1

(12) United States Patent
Challener et al.

(10) Patent No.: US 6,748,544 B1
(45) Date of Patent: Jun. 8, 2004

(54) DISCRETE, BACKGROUND DETERMINATION OF THE ADEQUACY OF SECURITY FEATURES OF A COMPUTER SYSTEM

(75) Inventors: David Carroll Challener, Raleigh, NC (US); John Hancock Nicholson, III, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/378,160

(22) Filed: Aug. 19, 1999

(51) Int. Cl.[7] .......................... G06F 11/30; G06F 15/173
(52) U.S. Cl. ...................... 713/202; 713/201; 713/193; 709/224; 709/225
(58) Field of Search ................................. 713/202, 201, 713/193; 709/224, 225

(56) References Cited

U.S. PATENT DOCUMENTS

| 5,204,966 A | * | 4/1993 | Wittenberg et al. ......... 713/202 |
| 5,418,854 A | | 5/1995 | Kaufman et al. ............. 380/23 |
| 5,594,796 A | | 1/1997 | Grube et al. .................. 380/25 |
| 5,629,981 A | | 5/1997 | Nerlikar ....................... 380/25 |
| 5,682,143 A | | 10/1997 | Brady et al. ................. 340/572 |
| 5,787,174 A | | 7/1998 | Tuttle ........................... 380/23 |
| 5,874,902 A | | 2/1999 | Heinrich et al. ....... 340/825.54 |
| 5,883,960 A | | 3/1999 | Maruyama et al. ........... 380/23 |
| 6,064,736 A | * | 5/2000 | Davis et al. ................. 713/155 |
| 6,286,102 B1 | * | 9/2001 | Cromer et al. .............. 713/200 |

OTHER PUBLICATIONS

Bergando et al., "High Dictionary Compression for Proactive Password Checking", Nov. 1998, ACM Press, vol. 1, Issue 1, p. 5.*
JA998214—Abstract.
JA998227—Abstract.

* cited by examiner

Primary Examiner—Matthew Smithers
Assistant Examiner—Courtney D. Fields
(74) Attorney, Agent, or Firm—Dillon & Yudell, LLP; Carlos Munoz-Bustamante

(57) ABSTRACT

A system for checking the level of system security on a PC platform is disclosed. The system comprises of a Radio Frequency Identification (RFID) unit. The RFID unit scans a PC platform and extracts relevant security information from its Basic Input/Output System (BIOS). The extracted information is analyzed by a data processing system connected to the RFID unit to determine if the security access available on the PC platform is adequate. A threshold adequacy level is established by a system manager. When the security on the PC is inadequate, a signal is generated to alert the network manager and/or the user of the PC to upgrade the PC's security.

28 Claims, 5 Drawing Sheets

DISCRETE, BACKGROUND DETERMINATION OF THE ADEQUACY OF SECURITY FEATURES OF A COMPUTER SYSTEM

BACKGROUND OF THE INVENTION

1. Technical Field

The present invention relates in general to security access mechanisms and in particular to security access to electronic units including computer systems. Still more particularly, the present invention relates to a method and system for efficiently checking the level of security on electronic units including data processing systems, utilizing "Asset ID" technology.

2. Description of the Related Art

Security of personal computer (PC) platforms in large enterprises is an important aspect of network/PC management. One problem that occurs frequently in large businesses is that security policy for accessing PC platforms is not enforced. Today, the principal means of authorization for accessing a PC are a set of system passwords: the Power-on-Password (POP), the Privileged Access Password (PAP) or supervisor Password, and the hard drive (HD) password. Organizations may not consistently administer and enforce the use of these passwords to protect access to PC resources. This problem arises because the policy is difficult to enforce. In addition, because some people regard security policies as onerous, they are often not used or ignored.

Password protection is commonly utilized to control access to individual computer systems, computer networks, and other data processing resources. A password is a special sequence of characters that uniquely "authenticates", i.e., confirms a user's identity, to a computer system and that is used for security purposes to control access to information and operations of the computer. Each time a user desires to obtain access to a password-protected resource, the user must enter a password. If the password entered by the user is valid, the user is permitted to access the password-protected resource; if the entered password is invalid, access is denied.

It is known that the security of protected data processing resources can be enhanced by increasing password complexity, which may entail, for example, enforcing a minimum password length, requiring the user to enter multiple passwords (e.g., a pass phrase), or requiring case-sensitive passwords or passwords containing both letters and numbers. Security is even further enhanced by limiting the duration of password validity. Thus, in very secure systems, passwords may be valid for only a single day or even a single access.

However, when users are allowed to select their own passwords, they tend to choose passwords that are easily remembered; unfortunately, these passwords may also be easily guessed or decrypted. One common threat to a password-based authentication system is an impostor capable of guessing the password of an authorized user. With the use of an automated system configured to generate character sequences at a high rate, the impostor can quickly "guess" large numbers of common names and words, typically by replaying every word in a dictionary. This guessing method is called a "dictionary attack".

In a stand-alone computer, the operating system has the responsibility for authenticating users. That is, upon presentation of a valid user's password during a login procedure, the operating system verifies the identity of the user by checking the presented password against a list of valid passwords. This type of authentication procedure may prevent a dictionary attack because, after a certain number of wrong guesses, the operating system disables the account being attacked.

Presently, access via physical "keys," such as smart cards, and biometrics devices, such as fingerprint and other physical tokens, are beginning to be used in conjunction with or in place of passwords for accessing PCs. With distributed computing, as the data stored on PCs becomes more valuable, a means to quickly detect whether a particular PC has the correct system support (i.e. use of passwords and associated access control devices) is needed for the organization's security policy. This need also applies equally to a portable PC, such as a laptop, leaving the building or a collection of desktops requiring a higher level security policy as in a finance department.

Another important aspect of ensuring security of PCs and other electronic units (hereinafter also referred to assets) is the ability of the owner to distribute/deploy them within their organization with a minimum amount of effort and to continue to track each one throughout its life. The system manager has to keep up with specific information about the equipment and its user, preferably without applying power to it. Asset Identification (ID), developed by International Business Machines Corporation (IBM), is utilized in management of personal computers, computer peripherals, and other electronic assets. Means exist to electronically interrogate a PC across a network via the Desktop Management Interface to determine the state of its access controls. This idea using Radio Frequency Identification (RFID) does not require the system to be attached to a network, nor powered on.

One of the problems encountered with existing security checks is the necessity to turn the asset on and actually enter the password in order to gain knowledge of the level of security which exists on the asset. Presently, system managers and users are only able to determine the adequacy of the security access by being aware of the access mechanism/password and then manually or otherwise comparing it for sufficiency. This method often leaves a traceable record of the password which may eventually lead to a breach in security access on the asset. A corporation, for example, may want to be able to ensure that none of its systems have weak passwords, without being willing to have a means of obtaining the password themselves.

In light of the foregoing, the present invention recognizes that it would be desirable to have a method and system for efficiently checking the level of security protection available on a data processing system and/or other electronic asset. It would be further desirable if such a method and system was completed without actually having to power-on the asset and entering the security password, thus reducing the risk of a security breach during implementation.

SUMMARY OF THE INVENTION

It is therefore one objective of the present invention to provide better security on accessible secured electronic systems.

It is another objective of the present invention to provide a method and system for efficiently checking the level of security on an electronic unit such as a data processing system utilizing Asset ID technology.

The foregoing objectives are achieved as is now described. A system for checking the level of system security on a PC platform is disclosed. The system comprises of a Radio Frequency Identification (RFID) Unit operated by a system manager. The RFID unit scans a PC platform and extracts relevant security information from its Basic Input/Output System (BIOS). The extracted information is analyzed by a data processing system connected to the RFID unit to determine if the security available in the PC platform is adequate. A threshold adequacy level is established by the system manager. When the security on the PC is inadequate, a signal is generated to alert the network manager and/or the user of the PC to upgrade the PC's security. In one embodiment, the invention utilizes Asset ID technology to determine the security information while the asset is turned off and thereby reduce the possibility of a breach of security during implementation.

All objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
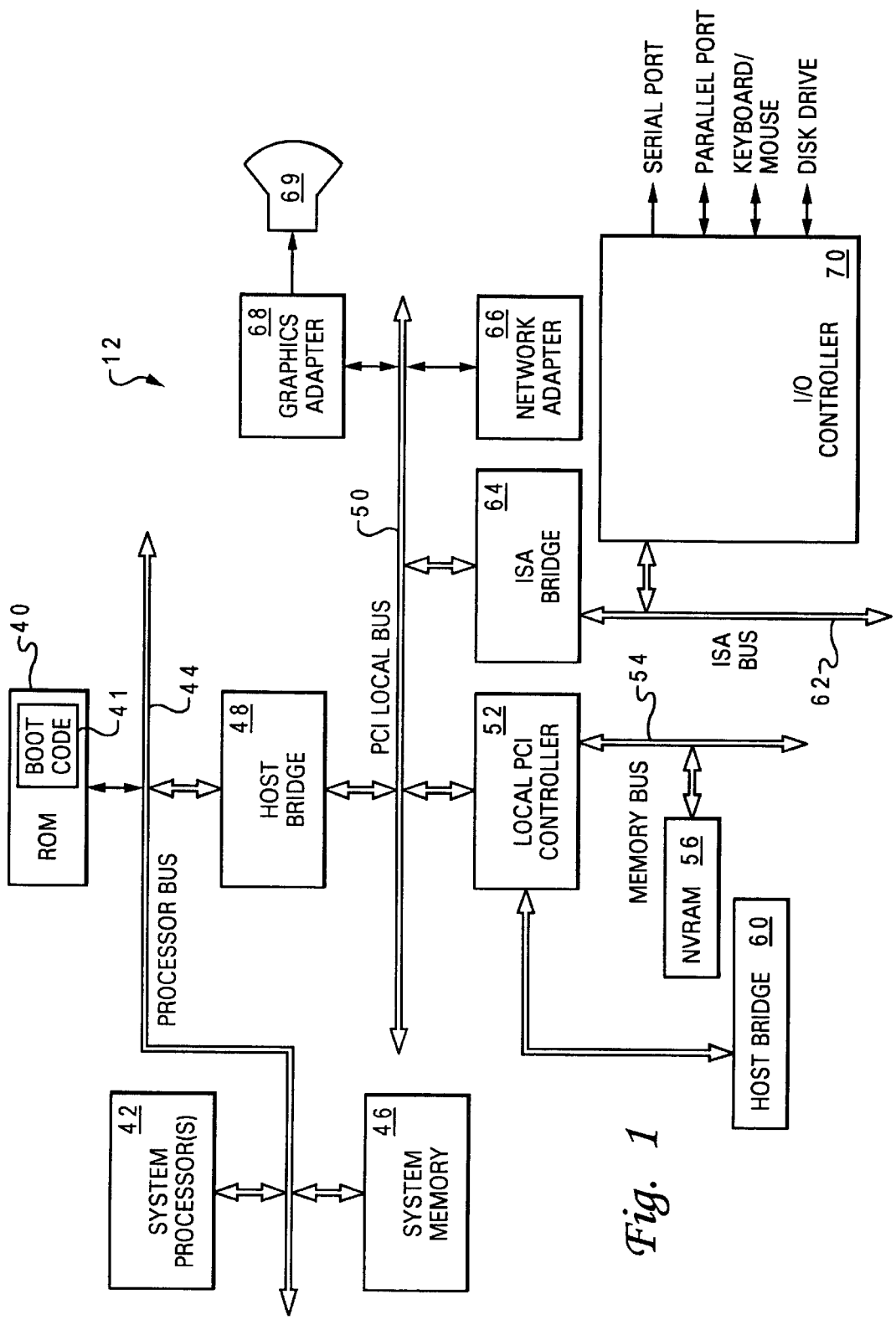
FIG. 1 depicts a block diagram of the internal components of a password-protected computer system in accordance with the present invention.

With reference now to the figures and in particular with reference to FIG. 1, there is illustrated an internal structure of a data processing system 12 with which the present invention may advantageously be utilized. Data processing system 12 may be one of networked computers at a corporate campus, including local area networks (LANs), which has a number of individual computer systems interconnected. The illustrative embodiment depicted in FIG. 1 may be a desktop computer system, such as one of the Aptiva® series of personal computers, or a workstation computer, such as the RS/60000®, (both manufactured by International Business Machines (IBM) Corporation of Armonk, New York). Data processing system 12 may also be a portable system such as a portable laptop or palmtop computer; however, as will become apparent from the following description, the present invention is applicable to the enforcement of security on any data processing system resource. Those skilled in the art will appreciate that various uses and types of computer systems exist which may all require password or other security access protection.

In order to restrict access to the various resources to only authorized users, each entry point into a computing environment or individual system is preferably password protected. That is, in a preferred embodiment, a user must enter at least a power-on password (POP) to logon to the computer. Additional passwords or pass phrases may be required for the user to obtain access to additional resources of a larger computing environment.

Returning now to FIG. 1, data processing system 12 includes at least one system processor 42, which is coupled to a Read-Only Memory (ROM) 40 and a system memory 46 by a processor bus 44. System processor 42, which may comprise one of the PowerPC™ line of processors produced by IBM Corporation, is a general-purpose processor that executes boot code 41 stored within ROM 40 at power-on and thereafter processes data under the control of operating system and application software stored in system memory 46. The invention operates at one level to "capture" the security measure required to boot up the system utilizing Radio Frequency Identification (RFID) and Asset ID technology and then analyze the security measure for adequacy. In the preferred embodiment, the data processing system does not have to be turned on as will become obvious with the discussion of ASSET ID and RFID below. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces data processing system 12 to LAN 10, and graphics adapter 68, which interfaces data processing system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Data processing system 12 further includes Industry Standard Architecture (ISA) bus 62, which is coupled to PCI local bus 50 by ISA bridge 64. Coupled to ISA bus 62 is an input/output (I/O) controller 70, which controls communication between data processing system 12 and attached peripheral devices such as a keyboard, mouse, and disk drive (e.g., storage 14). In addition, I/O controller 70 supports external communication by data processing system 12 via serial and parallel ports.

In the preferred embodiment, a system manager's computer system is coupled to an RFID unit (reader) which scans other computer systems for security access information. Additionally, the system manager's computer maintains an algorithm required to complete the comparison/checking process for the adequacy of the information. The system manager's computer system further maintains a database of inadequate security measures utilized during the comparison stage. The system manager's data base may be rather extensive and continually updated.

In another preferred embodiment, each data processing system 12 is provided with a triviality checker software algorithm within it Basic Input/Output System (BIOS) and accompanying basic list of inadequate security measures for comparison. This allows the invention to be completed within the computer system itself without requiring it to send information to the system manager's computer system. In this embodiment, the user is provided with a notice (preferably on screen) at power-on, telling him/her that his security password is inadequate and requires changing. In a network environment, the information may also be transmitted to a network server so that the system manager is alerted of the inadequate security measure. The limitations to this embodiment are in the size of the BIOS storage location. Once the list of trivial passwords/security measures becomes substantial, then the system manager's computer system, with its dedicated database storage area, will take over the comparison step as described above. In this situation, the basic (more egregious/common) faulty security systems may still be stored within each computer system.

In determining if the password is non-trivial, the invention as implemented specifically prevents the password from ever existing in the system memory in a way that can be read. This is done by including in the BIOS itself a password triviality checker, as described above. The triviality checker checks for such things as password length, inclusion of non-alpha characters, etc. Then the status of the triviality of the password is returned. If the triviality checker needs to be updated, the update is completed by flashing the BIOS to a BIOS that contains a different triviality checker. Those skilled in the art are familiar with the methods of changing a BIOS and the terminology involved in its implementation (i.e. flashing). By utilizing this technique, a password can be checked against a known set of weak passwords, to determine if there is match. This check is conducted without exposing the password itself. This is particularly tricky, as such lists of weak passwords are typically quite large, so as not to fit inside BIOS. Thus information about the password is required to exit the BIOS, and still not compromise the password (unless it is weak).

In the first preferred embodiment, RFID is used to both quickly inventory what access controls are in effect on a particular PC and to detect at appropriate locations (such as entrance/exits) whether or not a PC within scan range of a RFID reader has appropriate access protection. RFID operates within the Asset ID technology described below.

In the preferred embodiment, the invention extends the functionality of Asset ID to enable a system manager to efficiently capture security access information from a computer system. The Asset ID subsystem is designed to allow this capability by including within the asset a dual-ported Electrically-Erasable Programmable Read-Only Memory (EEPROM) that allows access to its stored data through a standard bus within the asset or through a wireless RF interface. Since power for RF communication is obtained from the reader through 10 the RF signal transmission, the RFID data can be read even with the asset turned off.

An Asset ID subsystem is comprised of two components: a tag and a reader. A tag includes a non-volatile storage element (such as EEPROM) and an antenna device, both of which are embedded in or attached to the asset to be protected. The EEPROM is typically a dual-ported, low power EEPROM that has both a standard system bus interface and a radio frequency (RF) interface, either of which is capable of accessing the data stored within the EEPROM. The antenna is designed to couple to the EEPROM energy generated by a reader. Typically, the system bus of the EEPROM is connected to a bus within the asset to allow access to the data from the system. Since the tag is integrated into the asset, this tag is called an integrated tag. If the tag has no system bus interface to the EEPROM, the tag is called a non-integrated tag. These non-integrated tags are typically used to provide the RF capability for existing assets. The present invention utilizes the functionality of EEPROMs to create a BIOS which controls the password setting of the computer system. Those skilled in the art are familiar with EEPROMs and their functional aspects.

A reader is required to read or write data using the, RF interface. Three general types of readers are: hand-held port, portal and panel. The preferred embodiment utilizes either a panel reader which is usually mounted on a wall or placed on a counter near a protected area, or a portal reader which has a more permanent installation, typically located at doorway or portal to a protected area. Portal readers are positioned so as to require the asset to be carried through the reader field to exit or enter the area. In the preferred embodiment, the EEPROM of the secured asset contains an integrated tag.

This aspect of the present invention is implemented in the following manner. Into each system in Non-Volatile Random Access Memory (NVRAM) is added a nonce or "unique random derived secret" which is known by the corporation (for example, by hashing the system serial number concatenated with a corporate password). A nonce is a random set of characters which are linked/concatenated to a known set of characters to create a unique random derived secret.

For purposes of this invention and as known in the art, a nonce is a random alphanumeric stream within the memory subsystem. The nonce is write-only without the system PAP. Upon request, the RAM will hash the concatenation of the nonce with the password and export the result. A corporate security program then hashes its dictionary concatenated with the nonce and compare the results. If any of them are the same, the password is weak.

Figure 2:
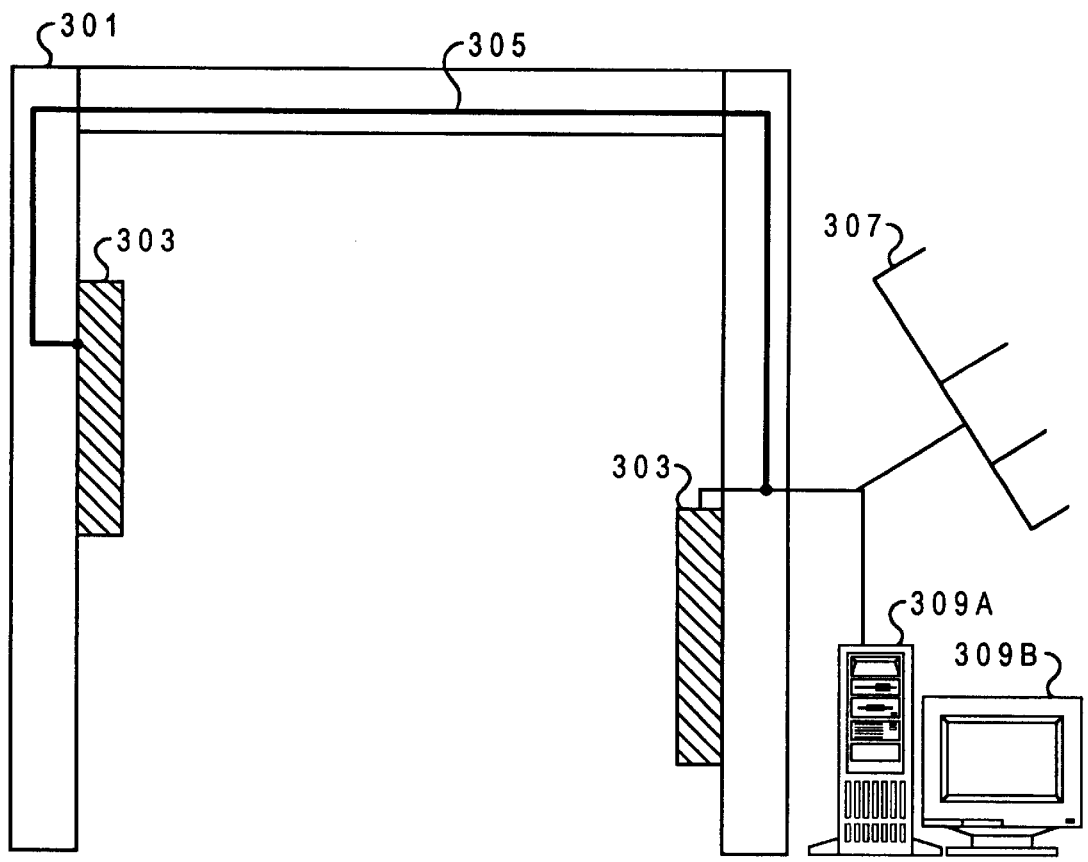
FIG. 2 illustrates a block diagram of a modified access point to a facility in which the security enforcement is conducted in accordance with the present invention.

FIG. 2 depicts one implementation of the portal reader system utilized within the invention. The reader 303 is placed inside the exit/entry way 301, which may be a doorway or gate or open entrance to a facility. Two readers 303 are depicted in this illustration with a connection wire 305 running through the frame of the exit/entry way 301. The specific location of the readers will be determined based on the specifications such as dimensions of the exit/entry way 301, recommended placement of the reader 303 based on Asset ID and RFID specifications, etc.

The stored password is made to comply with Asset ID Programming Specification. (i.e. Asset ID compliant.) A useful part of Asset ID is a non-volatile memory space that can be used to store Asset ID data. The memory space within the EEPROM, whether integrated or not, is referred to as the Enhanced Asset Information Area (EAIA). Data within the EEPROM is organized into three main areas: Serialization Information Area, User Information Area, and Configuration Information Area. To be Asset ID compliant, data stored in these areas must conform to certain structures. Data is written to and read from the EAIA through either the RF Interface or the bus interface. Access through the RF Interface requires an Asset ID compliant portable hand-held reader, panel reader, or door reader (hereafter referred to as reader). Access through the bus interface requires software written to an API appropriate for the asset and device software.

A more in depth discussion of Asset ID is presented in "Asset ID RF Signal and Protocol Specification" co-authored by Atmel Corporation, HID Corporation and International Business Machines Corporation and "Asset ID Programming Specification" authored by IBM Personal Systems Group. Both specifications are published at http://www.pc.ibm.com/us/desktop/assetid/standards.html and are hereby incorporated by reference.

Returning to FIG. 2, the sides of the entrance/exit are preferably designed so that the specific dimensions correspond to the optimal location for the scanners/readers.

Readers 303 are coupled to system manager's data processing system 309A. Data processing system 309A collects the scanned password information from the EEPROM/BIOS of the computer systems which pass though exit/entry way 301. Data processing system 309A first determines the type of security access measures being utilized with the asset, then performs the analysis to determine the adequacy of the security passwords found. When it is determined that system security is not adequate, data processing system 309A signals a system manager via display 309B or audible message (such as a beep or simulated electronic voice message). Utilizing Asset ID, the data processing system may produce a report which identifies the particular system, the type of security measure it has, and why the security measure is inadequate without disclosing the actual password. A Universally Unique Identifier (UUID) of each asset is located on the motherboard. The UJID page is a 16 byte area in the EEPROM. The first twelve bytes of the page are reserved for storing an asset identifier, which is transmitted in response to certain commands from a reader. The system manager may then call the user of the asset to bring in the asset to update its security or have the user update it himself.

In the networked environment, data processing system 309A may be connected to the networked computer terminals via network lines 307. In this embodiment, panel reader is located at various points within the network environment and periodically checks security access information of assets in the vicinity and report the information to data processing system 309A for analysis. When a system is not in compliance with the security requirements, data processing system may signal the user via the network connections to perform the upgrade of the system security. Alternately, data processing system may be able to update the system BIOS via the network connection. Those skilled in the art can appreciate how a system BIOS can be changed via a network line.

During implementation of the invention, two determinations are made with regards to the POP/PAP/HD settings or the use of physical tokens and biometrics in a desktop PC:

(1) whether the password is set and/or whether the hardware device has been configured and access control initialization has been performed by the authorized user(s); and (2) if a password is used, determine whether it is non-trivial.

The preferred embodiment of the present invention determines both, and reports them in a manner which allows the security to be improved, without compromising the security of the system itself.

The process of determining the level or type of security is conducted by first implementing in the BIOS a call that returns the state of setting. This determines if a password has been set and/or if a physical token such as a smartcard and appropriate biometric device has been initialized for access control. If passwords have not been set, there is no security to compromise. If they are set, knowing that fact does not compromise the security.

Figure 3:
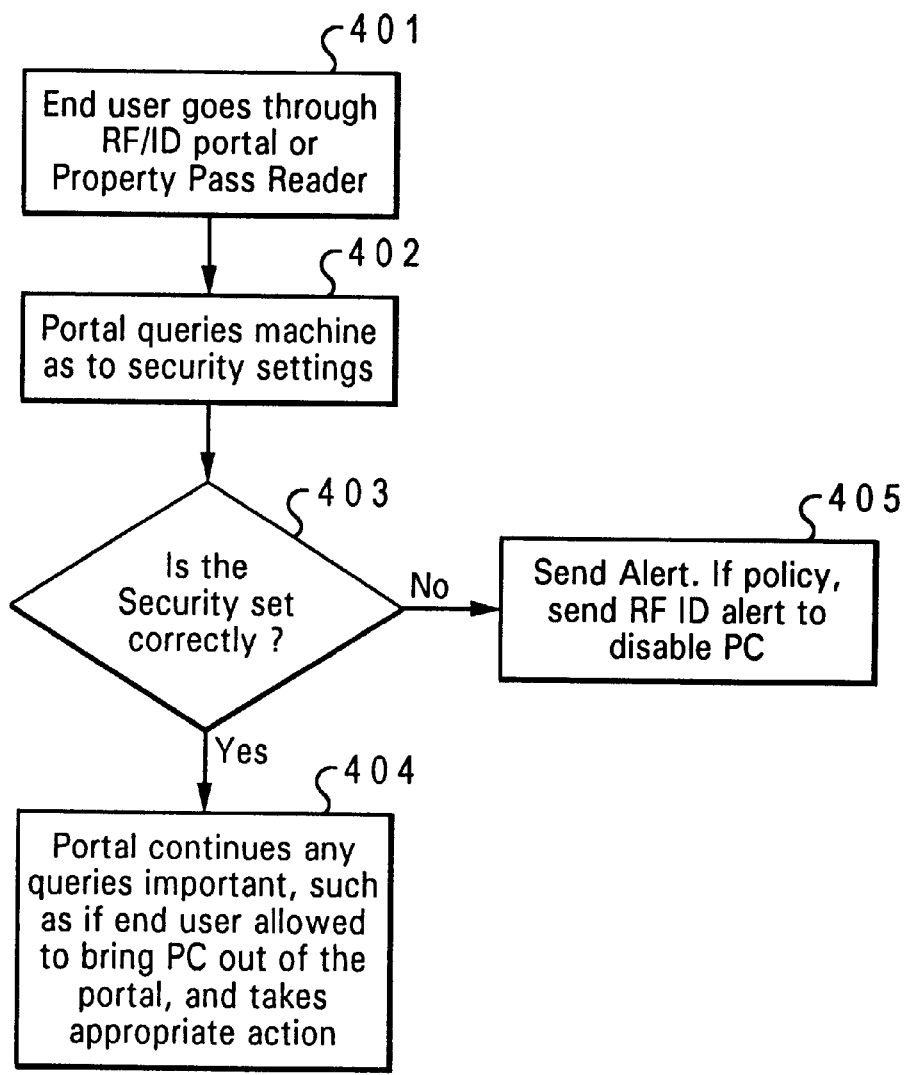
FIG. 3 is a high level logical flowchart of the process involved in the implementation of the invention in accordance with a preferred embodiment of the present invention.

With reference now to FIG. 3, there is illustrated a high level logical flowchart of a method of a security policy enforcement on a data processing system, such as data processing system 12 of FIG. 1, in accordance with the present invention. A user goes through the RFID portal or property pass reader (step 401). The portal queries the asset as to its security settings (step 402). A check is then made to determine if the security access is set correctly/adequate (step 403). If the security is set correctly, the portal continues any queries which are important, such as if the end user is allowed to bring the PC out of the portal, etc. (step 404). If, however, the security is not set correctly, then an alert signal is sent (step 405) In one embodiment, when this occurs, an RFID alert is sent which disables the PC. This is accomplished by using the alert signal to set a tamper bit (microcode) which causes the system to default to requiring an administrative or supervisor on bootup.

Figure 4:
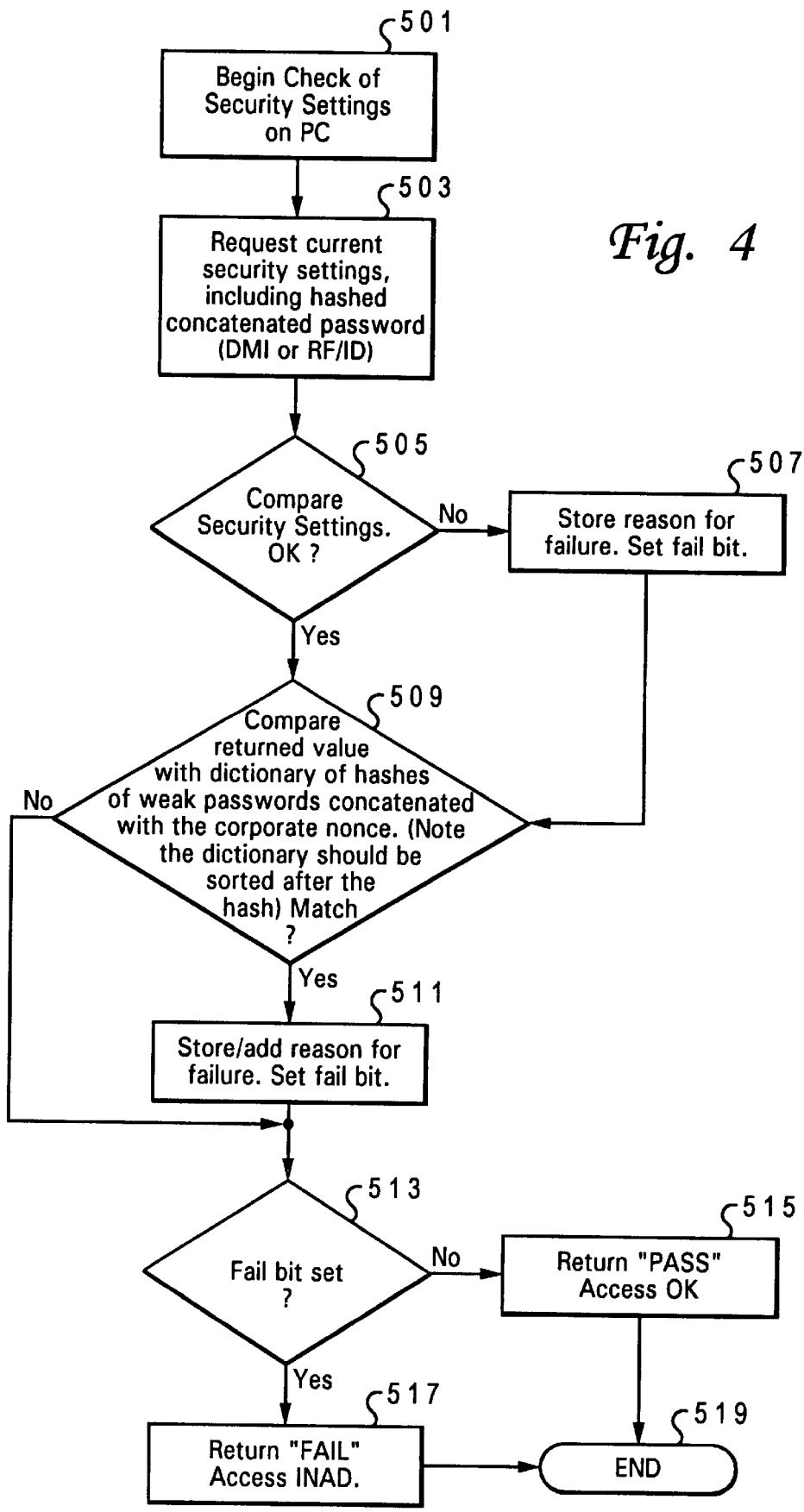
FIG. 4 is a high level logical flowchart of the algorithm utilized to determine the sufficiency of the security available on a PC in accordance with one embodiment of the present invention.

Referring now to FIG. 4, there is depicted a high level ID logical flowchart of an exemplary method of enforcing power-on password protection for a computer system, such as data processing system 12, in accordance with the present invention. The process shown in FIG. 3 can be implemented, for example, by boot code 41 within ROM 40. The process begins (step 501) by beginning the check of the security settings on a PC. The processor requests current security settings, including a hashed concatenated password (step 503). A comparison is then made to determine is the security settings are okay (step 505). When the security settings are not okay, the reason for the failure is stored and a fail bit is set (step 507). In either event, the return value is compared with a dictionary of hashes of weak passwords concatenated with the corporate nonce to determine if there is a match (step 509). If a match exists, then the reason for the failure is stored and another fail bit is set (step, 511). In either case, the fail bit is checked (step 513). If the fail bit is not set, then a "pass" (security access okay) signal is returned (step 515). If, however the failed bit is set, it returns a "fail" (security access inadequate) along with the reason for the failure (step 517). Then the process ends (step 519).

Figure 5:
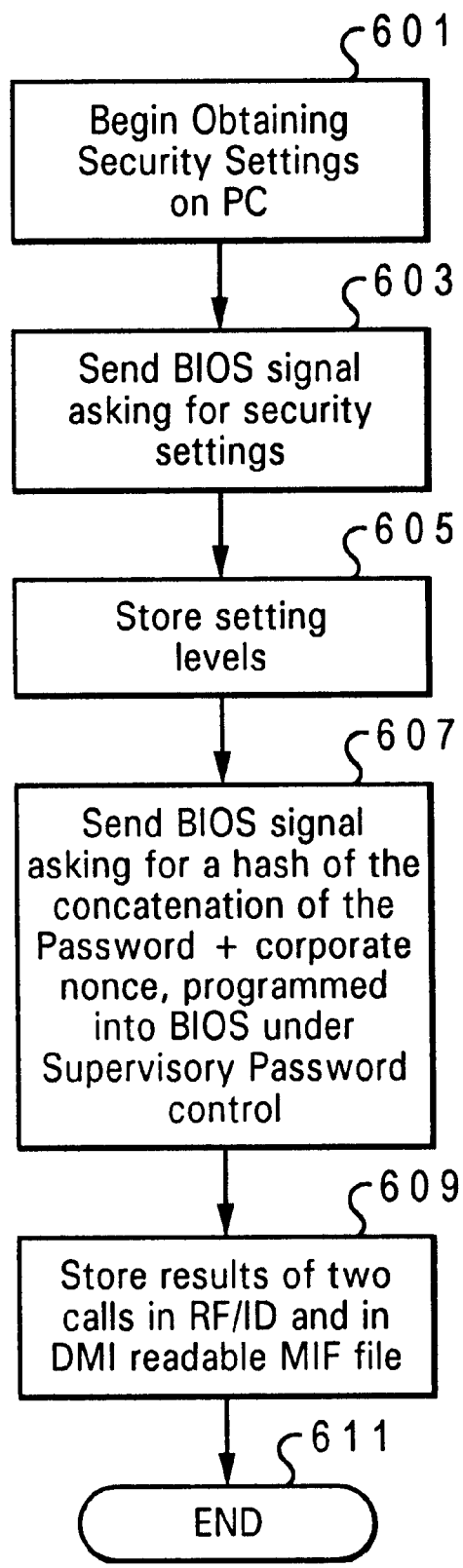
FIG. 5 is a high level logical flowchart of the RFID setup utilized in accordance with one embodiment of the present invention.

FIG. 5 depicts the process involved in the setup of the RFID. The process begins when the security settings on the PC are obtained (step 601). A signal is sent to the BIOS asking for its security settings (step 603). The setting levels received are then stored (step 605). A second signal is sent to the BIOS asking for a hash of the concatenation of the password and the corporate nonce (step 607). This hash is programmed into the BIOS under supervisory password control. Finally, the results of the two calls are stored in RF/ID and DMI readable MIF file (step 609) and the process ends (step 611).

A number of related embodiments may also be implemented within the scope of the invention:

(1) The Asset ID tag can be updated to reflect the POP/PAP/HD password status and the status of the use of access control hardware devices. If the security level is not high enough, it is read as a mobile system is removed from premises, so as to make it conform with security policy; and (2) A high level operating system (OS) can make certain that the security requirements necessary to maintain boot integrity have been followed by providing and checking security status quickly and even when the system is not powered on and in transit.

While the invention has been particularly shown and described with reference to an illustrative embodiment, it will be understood by those skilled in the art that various changes in form and detail may be made therein without departing from the spirit and scope of the invention. For example, although aspects of the present invention have been described with respect to one or more computer systems executing software that directs the functions of the present invention, it should be understood that present invention may alternatively be implemented as a computer program product for use with a computer system. Programs defining the functions of the present invention can be delivered to a computer system via a variety of signal-bearing media, which include, without limitation, non-writable storage media (e.g., CD-ROM), writable storage media (e.g., a floppy diskette or hard disk drive), and communication media, such as computer and telephone networks. It should be understood, therefore, that such signal-bearing media, when carrying or encoding computer readable instructions that direct the functions of the present invention, represent alternative embodiments of the present invention.

What is claimed is:

1. A system for discretely checking a level of security on data processing systems, said system comprising:

means for accessing a security password of a data processing system via a dynamic call within a basic input output system (BIOS) of said data processing system, wherein said call is dynamically initiated without requiring said data processing system to be in a power-on state and without user input, including user-entry of the password, and wherein said security password is never provided outside of an internal system environment during said access;

means for dynamically analyzing said security password to determine whether said password complies with pre-established parameters defining when a password is adequate for protection of the computer system; and means responsive to said analyzing for signaling when said security password is inadequate, wherein said signaling does not include an output of said password, such that said password is never revealed/outputted to a user-accessible environment during the password security checking process.

2. The system of claim 1, said analyzing means comprising:

means for dynamically inventorying what security access controls are in effect on said data processing system; and means for dynamically comparing said security password against a pre-established list of inadequate security passwords, wherein said security password is determined as adequate when said security password does not match any one of said inadequate security passwords.

3. The system of claim 1, further comprising:

means for monitoring an environment containing said data processing system; and means for detecting when said data processing system is being taken out of said environment.

4. The system of claim 1, wherein said accessing means includes:

means for instantiating a call within a BIOS of said data processing system which signals a state of security features being utilized by said processing system, said state corresponding to a first state utilizing a security password, a second state utilizing a physical token, or a third state utilizing a combination of both said first state and said second state; and means for indicating whether said security password is correctly established when said state is said first state;

wherein, when said dynamically accessing and analyzing occurs while said data processing system is in a power-down stage and said data processing system is a stand alone system, said signaling occurs responsive to a plower-up stage of said data processing system.

5. The system of claim 1, said analyzing means further comprising:

means for creating a database of "inadequate password criteria" stored on a data processing system;

means for comparing said security password against said inadequate password criteria;

means for signaling to a system manager via a remote signaling mechanism when said comparing results in a match, wherein said remote signaling mechanism is one of a network transfer mechanism and RFID.

6. The system of claim 4, further comprising:

means for adding a nonce into the non-volatile random access memory (NVRAM) of said data processing system, said nonce being created by hashing a serial number of the computer system concatenated with a password, wherein said nonce is write-only without a system PAP;

means for hashing said concatenation of said nonce with the password; and means for exporting a result generated by said hashing.

7. The system of claim 6, further comprising:

means for hashing a dictionary of a corporate security program concatenated with said nonce; and means for comparing a result to determine if the password is weak, wherein the password is weak when the result indicates a match was found.

8. The system of claim 4, wherein said analyzing means includes:

means for including a password triviality checker within said BIOS, said password triviality checker checks for a plurality of conditions which indicate whether a password provides adequate security.

9. The system of claim 1, wherein said signaling means includes:

means for updating an Asset ID tag of said data processing system to reflect a password status and a status of the use of access control hardware devices;

means for quickly reading a security level of a system and making it conform to desired security levels;

means for implementing a BIOS to ascertain that said security requirements necessary to maintain boot integrity has been followed.

10. A system for checking a level of security of a mobile platform comprising:

means for dynamically checking a security setting on said platform to ensure that said setting has been set at a sufficiently high level for a site security policy, wherein said checking is dynamically initiated in a background BIOS process without user-entry of a security password; and means for analyzing if the security password does not provide adequate security to said mobile platform; and means for remotely extracting a result of said analyzing and signaling said result to a system administrator with access to a security checking system independent of said mobile platform, wherein said signaling signals when said result indicates an inadequate level of security of said mobile platform without revealing said password.

11. A method for checking a level of security on data processing systems, said method comprising the steps of:

accessing a security password from a data processing system via a dynamic call within a basic input output system (BIOS) of said data processing system, wherein said call is dynamically initiated without requiring said data processing system to be in a power-on state and without requiring a current user-input, including an input of said password, and wherein said security password is not outputted outside of an internal system environment during said access;

analyzing said security password against a pre-established list of in-adequate security passwords to determine whether said password complies with pre-established parameters defining when a password is adequate for protection of the computer system; and signaling when said security password is inadequate in response to said analyzing step, wherein said signaling does not include an output of said password such that said password is never revealed/outputted to a user-accessible environment.

12. The method of claim 11, further comprising the step of inventorying what security access controls are in effect on said data processing system.

13. The method of claim 11, further comprising:

monitoring an environment containing said data processing system; and detecting when said data processing system is being taken out of said environment.

14. The method of claim 1, wherein said accessing step includes the steps of:

instantiating a call within a BIOS of said data processing system which signals a state of security features being utilized by said processing system, said state corresponding to a first state utilizing a security password, a second state utilizing a physical token, or a third state utilizing a combination of both said first state and said second state; and indicating whether said security password is active when said state is said first state;

wherein, when said dynamically accessing and analyzing occurs while said data processing system is in a power-down stage and said data processing system is a stand alone system, said signaling occurs responsive to a power-up stage of said data processing system.

15. The method of claim 11, said analyzing step further comprising the steps of:

creating a database of "inadequate password criteria" stored on a data processing system;

comparing said security password against said database of inadequate password criteria;

signaling to said system manager via a remote signaling mechanism when said comparing step results in a match, wherein said remote signaling mechanism is one of a network transfer mechanism and RFID.

16. The method of claim 15, further comprising the steps of:

adding a nonce into the non-volatile random access memory (NVRAM) of said data processing system, said nonce being created by hashing a serial number of the computer system that is concatenated with a password, wherein said nonce is write-only without a system PAP;

hashing said concatenation of said nonce with the password; and exporting a result generated by said hashing.

17. The method of claim 16, further comprising:

hashing a dictionary of a corporate security program that is concatenated with said nonce; and comparing a result to determine if the password is weak, wherein the password is considered weak when the result indicates a match was found.

18. The method of claim 14, wherein said analyzing step includes the step of including a password triviality checker within said BIOS, said password triviality checker checks for a plurality of conditions which indicate whether a password provides adequate security.

19. The method of claim 11, wherein said signaling step includes the steps of:

updating an Asset ID tag of said data processing system to reflect a password status and a status of the use of access control hardware devices;

quickly reading a security level of a system and making it conform to desired security levels;

implementing a BIOS to ascertain that said security requirements necessary to maintain boot integrity has been followed.

20. A computer program product for checking a level of security on data processing systems, said computer program product comprising:

a computer readable medium; and program instructions stored on said computer readable medium for:

accessing a security password from a data processing system via a dynamic call within a basic input output system (BIOS) of said data processing system, wherein said call is dynamically initiated without requiring said data processing system to be in a power-on state and without requiring user input, including any user-entry of said password, wherein said security password is not outputted outside of an internal system environment;

analyzing said security password against a pre-established list of inadequate security passwords to determine whether said password complies with pre-established parameters defining when a password is adequate for protection of the data processing system; and signaling when said security password is inadequate in response to said analyzing step, wherein said signaling does not include an output of said password such that said password is never revealed/outputted to a user-accessible environment.

21. The computer program product of claim 20, further comprising program instructions for:

dynamically inventorying what security access controls are in effect on said data processing system; and dynamically comparing said security password against a pre-established list of inadequate security passwords, wherein said security password is determined as adequate when said security password does not match any one of said inadequate security passwords.

22. The computer program product of claim 20, further comprising:

program instructions for monitoring an environment containing said data processing system; and program instructions for detecting when said data processing system is being taken out of said environment.

23. The computer program product of claim 20, wherein said program instructions for said accessing step includes:

program instructions for instantiating a call within a BIOS of said data processing system which signals a state of security features being utilized by said processing system, said state corresponding to a first state utilizing a security password, a second state utilizing a physical token, or a third state utilizing a combination of both said first and second state; and program instructions for indicating whether said security password is active when said state is said first state.

24. The computer program product of claim 20, said program instructions for said analyzing means further comprising:

program instructions for creating a database of "inadequate password criteria" on a data processing system;

program instructions for comparing said security password against said inadequate password criteria within said database;

program instructions for signaling to said system manager when said comparing step results in a match.

25. The computer program product of claim 24, further comprising:

program instructions for adding a nonce into the nonvolatile random access memory (NVRAM of said data processing system, said nonce being created by hashing a computer system's serial number concatenated with a password, wherein said nonce is write-only without a system PAP;

program instructions for hashing said concatenation of said nonce with the password; and program instructions for exporting a result of said hashing.

26. The computer program product of claim 25, further comprising program instructions for:

hashing a dictionary of said corporate security program concatenated with said nonce; and comparing the result to determine if the password is weak, wherein the password is considered weak when the result indicates a match was found.

27. The computer program product of claim 23, wherein said program instructions for said analyzing means includes:

program instructions for including a password triviality checker within said BIOS, said password triviality checker checks for a plurality of conditions which indicate whether a password provides adequate security.

28. The computer program product of claim 20, wherein said program instructions for said signaling means includes:

program instructions for updating an Asset ID tag of said data processing system to reflect a password status and a status of the use of access control hardware devices;

program instructions for quickly reading a security level of a system and making it conform to desired security levels;

program instructions for implementing a BIOS to ascertain that said security requirements necessary to maintain boot integrity has been followed.

* * * * *